Figure 1:
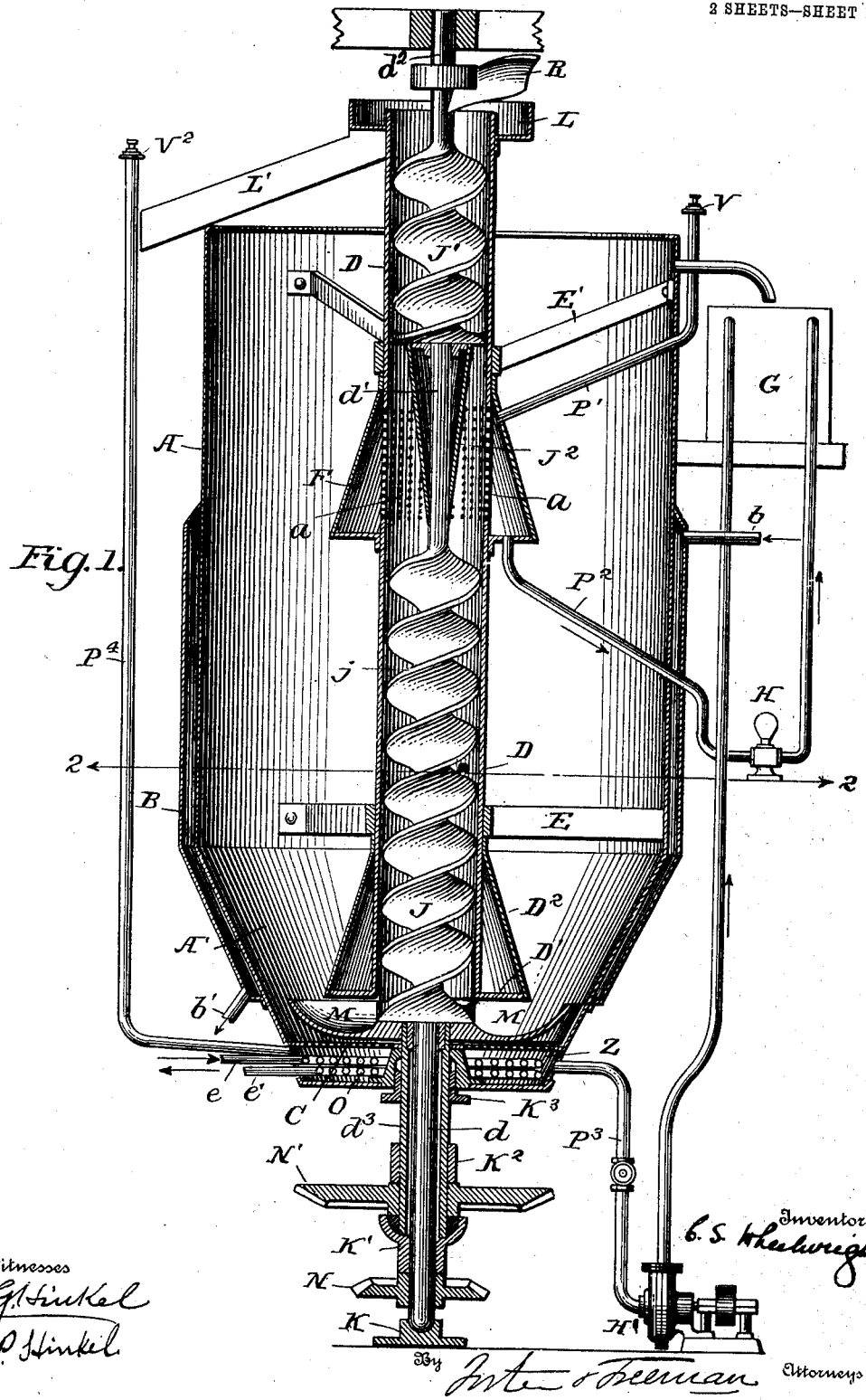

No. 719,541. PATENTED FEB. 3, 1903.
C. S. WHEELWRIGHT.
APPARATUS FOR SEPARATING OR DRAINING LIQUIDS FROM SOLIDS.
APPLICATION FILED NOV. 7, 1901. RENEWED JUNE 10, 1902.
NO MODEL.
2 SHEETS—SHEET 2.

Witnesses
J. G. Hinkel
F. P. Hinkel

Inventor
Charles S. Wheelwright
By Foster & Freeman
Attorneys

UNITED STATES PATENT OFFICE.

CHARLES S. WHEELWRIGHT, OF BRISTOL, RHODE ISLAND.

APPARATUS FOR SEPARATING OR DRAINING LIQUIDS FROM SOLIDS.

SPECIFICATION forming part of Letters Patent No. 719,541, dated February 3, 1903.

Application filed November 7, 1901. Renewed June 10, 1902. Serial No. 111,082. (No model.)

*To all whom it may concern:*

Be it known that I, CHARLES S. WHEEL-WRIGHT, a citizen of the United States, residing at Bristol, in the county of Bristol and State of Rhode Island, have invented a new and useful Improvement in Apparatus for Separating Liquids from Solids and Reclaiming the Same, of which the following is a specification.

The invention has been made with particular reference to the separation of liquids from wood-pulp, but, as will appear herein, is applicable to other arts. It may be employed with a slight additional contrivance to great advantage in the process of drying out fillings for paper, cloth, &c., and other uses will readily suggest themselves.

The most essential feature of the apparatus consists in the combination of a lifting or carrying screw having an auger-shaped thread and revolving in one direction in a closely-fitting cylinder, with spoon or propeller shaped feeding-blades revolving in the opposite direction with slight clearance in a vat or chamber at the lower end of the cylinder, the axes of the said screw and the said blades being in line one with the other.

As a whole the apparatus in which the invention is embodied consists, essentially, of a large receiving vat or shell, preferably conical at the lower end and provided with a false perforated bottom, a vertical cylinder in said vat, its lower end being a short distance above the said false bottom, a screw with auger-shaped blades or threads adapted to revolve in one direction in said cylinder, spoon or propeller shaped blades adapted to revolve in the opposite direction between said false bottom and the lower end of said cylinder, a delivery trough and spout for solid matter above said cylinder, a drain-pipe for liquids near the top of said cylinder below said delivery trough or spout, and a drain-pipe from said receiving vat or shell below said false bottom. The receiving vat or shell is provided with a steam-jacket, coming rather more than half-way up from the bottom, and steam-heating pipes may be let into the inside of the chamber. As shown, such an internal heating-pipe is provided for the lower part of the receiving-vat below the false bottom.

The invention consists, further, in details of construction, modifications, and contrivances for facilitating the operation of the main feature of the invention. Of these contrivances the most important consists of a vacuum-chamber near the top of the lifting-cylinder, the latter being perforated within said vacuum-chamber, a pump for said vacuum-chamber, a vacuum-valve for the same, and a tank adapted to receive the liquid contents of said vacuum-chamber as they are pumped out by said pump. As shown, an additional pump is placed in the drain-pipe from beneath the false bottom of the receiving vat or shell discharging into the same receiving-tank, and so, likewise, a vacuum-valve is provided for the portion of the receiving vat or shell below the said false bottom.

Figure 2:
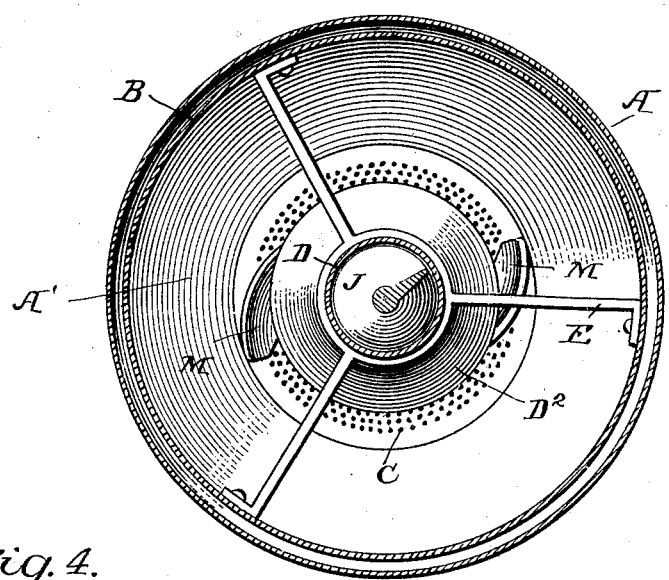
Figure 5:
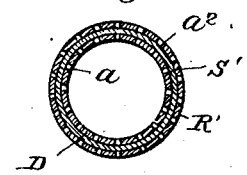
Figure 4:
Figure 3:
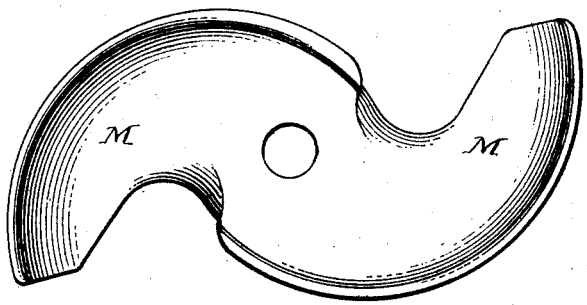

In the drawings hereto annexed and forming part of this specification, Figure 1 is a vertical section of the entire apparatus. Fig. 2 is a cross-section on line 2 2 of Fig. 1. Fig. 3 is a plan view of a pair of propeller-blades removed. Figs. 4 and 5 are modifications.

A is the receiving vat or shell, the conical portion at the bottom being marked A'. Its supporting-frame of ordinary kind is not shown. B is a steam-jacket for said vat or shell, provided with inlet-pipe $b$ and outlet-pipe $b'$. C is the false bottom for said vat, perforated as shown.

D is a vertical cylinder supported by two spider-frames E and E', the former being shaped as shown to resist the thrust of the screw revolving within said cylinder and the latter being arranged to hold said cylinder down against the lifting tendency of the said screw and material carried by said screw. The said spider-frames E and E' are secured to the side walls of the vat or shell A in any convenient way. D' is a circular flange at the bottom of said cylinder D, while $D^2$ is a tunnel-shaped guide fastened in any suitable manner to said cylinder D and said flange D'. The purposes of the said flange and guide will appear in the description of the mode of operation.

F is a vacuum-chamber secured to the cylinder D in any convenient way, being, as shown, a tunnel something like the tunnel-shaped guide above described, with a bottom like the circular flange D'. The said cylinder D is furnished with perforations $a\,a$, &c., in that portion about which said vacuum-chamber lies, as shown. P' is a pipe leading from said vacuum-chamber F to the outside of the vat A and there provided with the vacuum-valve V. P² is a discharge-pipe for liquids from said vacuum-chamber, as shown, discharging into liquid-reclaiming vat or chamber G by means of a pump H.

J is a screw with two auger-shaped threads or blades $j\ j'$, adapted to revolve in cylinder D, with close fit between periphery of threads and inner surface of cylinder, by means of shaft $d$, projecting from the lower end of said screw and having an end bearing K, as shown. The said screw J, as shown, is formed in two parts, which are rigidly connected by shaft $d'$, which lies within the perforated portion of the cylinder D; but, as will appear hereinafter, the portion of the screw J which lies above said connecting-shaft $d'$ and is marked J' is not absolutely necessary.

J² is a conical-shaped guide rigidly attached to shaft $d'$ and revolving with it. Its office is to squeeze against the perforated wall of the cylinder D the solid matter lifted by the screw J.

L is a trough to receive solid matter lifted by screw J at the top of the cylinder D above the vat A, supported by the frame of the entire apparatus. (Not shown.) L' is a discharge-spout from said trough L.

R is a scraper rigidly secured to the shaft $d^2$, which projects above the upper part J' of the screw revolving within cylinder D. It is shaped to throw outward and down into trough L matter coming out at the upper end of the cylinder D.

M M are spoon or propeller shaped blades revolving with easy clearance in the conical or lower portion of the vat or shell A by means of a vertical hollow shaft $d^3$, to which they are rigidly secured. The said shaft $d^3$ is hollow to permit the passage through it of the shaft $d$. It has an end bearing K', also hollow, for the same purpose and supporting-bearings K² and K³, the latter being a packing-box in the bottom of the vat A.

N and N' are gears for revolving, respectively, shafts $d$ and $d^3$.

P³ is a pipe leading from the lower part of the vat A below the false bottom C and discharging into the before-mentioned reclaiming-vat for liquids G by means of pump H'.

O is a heating-coil in the lower part of vat A, there marked Z, below the false bottom C, having an inlet $e$ and an outlet $e'$.

P⁴ is a pipe leading from the vat just below the false bottom C to the level of the top of the vat and there furnished with a vacuum-valve V².

The mode of operation, taking the case of the separation of liquids from wood-pulp, so far as it may be of assistance to describe the same, is as follows: The pulp being of a consistency of, say, fourteen parts pulp and eighty-six water is fed into the top of the vat A in any ordinary but gentle manner. Reaching the propeller-shaped blades M M, which revolve in one direction, it is fed to the lifting-screw J, revolving in the opposite direction, and by said lifting-screw is carried up through the cylinder D. On arriving at the vacuum-chamber F much of the water originally held in the pulp is sucked into the vacuum-chamber through the perforations $a$, aided by the guide J², which in its revolution with screw J and shaft $d'$ squeezes the pulp against the perforations $a$ in the wall of the cylinder D. Pump H pumps water from the vacuum-chamber F into receiving or reclaiming tank G and tends to maintain a vacuum above the water in F. The pulp relieved of the water is forced farther up through the cylinder D, above the vacuum-chamber, by the revolution of the screw J, whether that screw is aided, as shown, by auger-blades above the shaft $d'$ or whether the shaft $d'$ remains a simple shaft, to the top of the cylinder. On arriving at the top of the cylinder it is swept into trough L by scraper R and is discharged from the entire apparatus through spout L'. In the meantime liquid at the bottom of the vat is drawn through the false bottom C into chamber Z by pump H', which pumps the liquid so drawn up into reclaiming-tank G. Any vacuum that is thus formed in chamber Z is regulated by the vacuum-valve V², and in like manner the vacuum formed in chamber F is regulated by vacuum-valve V. The tunnel-shaped guide D² gives a general direction to the pulp or other contents of the vat as such contents are fed to the blades M M, while the circular flange D' prevents the heavier portion of the contents of the blades M M from escaping over the inner portion of the back edges of the blades and directs such contents to the screw J, while the curves of the blades M M, as may be seen at Figs. 2 and 3, are such that they force the heavier part of the pulp or contents of the vat toward the center of the machine underneath the circular flange D', to be taken by the screw J, and yet permit the lighter or extremely watery part to pass over their upper back edges outside of the circular flange D' and fall upon the false bottom C below. The operation at the bottom of the apparatus is obvious. The heating-pipes O and the steam-jacket B may be kept at any required temperature. As a general thing it is desirable to maintain the pulp throughout the process at the temperature at which it is fed to the apparatus.

The modifications hereinabove spoken of for adapting this invention to the drying or partial drying of fillings for paper, &c., consist, essentially, in a modification of the false bottom C of the vat A and a similar modification of the perforated portion of the cylinder D within the vacuum-chamber F. These modifications are shown at Figs. 4 and 5. In Fig. 4, C is the perforated false bottom of the vat, provided with perforations $a'$. S is a sheet of filter-felting, and W is a perforated second false bottom, the whole constituting a well-known drainer-bottom. In Fig. 5, in a similar manner, D is the cylinder provided with perforations $a^2$. S' is a sheet of filter-felting, while R' is a tube provided with perforations $a'$, surrounding said felting.

It is unnecessary to describe the mode of operation by which fillings for paper, &c., may be relieved of a large portion of the water contained in them during the process of manufacture—say at a stage in such manufacture when the filling proper and the water are in about equal proportions.

I claim—

1. The combination with a vat provided with a false bottom and a vacuum-chamber beneath, of a cylinder within said vat provided with a lifting-screw, the periphery of whose blades closely fits the interior of said cylinder, and feeding-blades in the bottom of said tank beneath said lifting-screw, the said feeding-blades being adapted to revolve in one direction and the said screw in the opposite direction, substantially as described.

2. The combination with a vat provided with a false bottom and a vacuum-chamber beneath, a cylinder within said vat provided with a lifting-screw, feeding-blades in the bottom of said tank beneath said lifting-screw, the said feeding-blades being adapted to revolve in one direction and the said screw in the opposite direction, of a circular flange outside said cylinder near the bottom thereof and just above the inner portion of said feeding-blades, to prevent the escape of the contents of the said feeding-blades and guide them to the lifting-screw, substantially as described.

3. The combination with the vat A and cylinder D, of propeller-shaped feeding-blades M M and lifting-screw J provided with auger-shaped threads or blades, the said feeding-blades being adapted to turn in one direction and the lifting-screw being adapted to turn in the opposite direction, substantially as described.

4. The combination with feeding-blades M M, cylinder D, provided with perforations $a$, and lifting-screw J, of vacuum-chamber F, substantially as described.

5. The combination with feeding-blades M M, cylinder D provided with perforations $a$, of lifting-screw J, provided with guide $J^2$, substantially as described.

6. The combination of vat A provided with false bottom C, cylinder D, lifting-screw J, feeding-blades M M, and circular flange D', substantially as described.

7. The combination of the cylinder D, lifting-screw J, and feeding-blades M, M, circular flange D', and tunnel-shaped guide $D^2$, substantially as described.

CHARLES S. WHEELWRIGHT.

Witnesses:
JOHN T. WHEELWRIGHT,
CURTIS K. COBB.